Feb. 2, 1965   L. A. LUEDTKE   3,168,189
CONVEYORS
Filed Nov. 1, 1961   2 Sheets-Sheet 1

INVENTOR.
LLOYD LUEDTKE
BY
*[signature]*
ATTORNEY

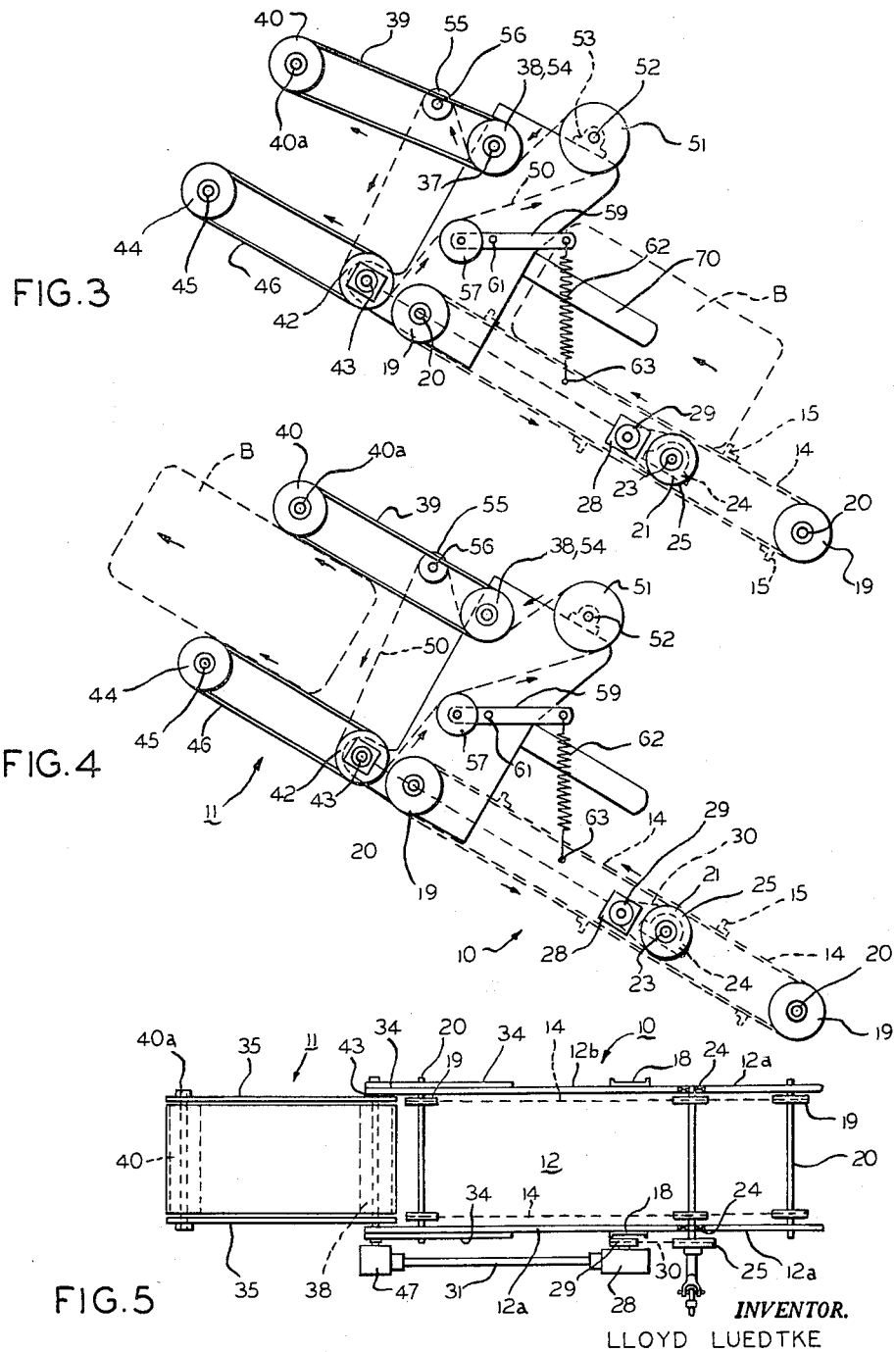

United States Patent Office 3,168,189
Patented Feb. 2, 1965

3,168,189
CONVEYORS
Lloyd A. Luedtke, P.O. Box 123, Allenton, Wis.
Filed Nov. 1, 1961, Ser. No. 149,419
1 Claim. (Cl. 198—128)

This invention relates generally to improvements in conveyors, and particularly to a conveyor adapted for elevated baled material, and for propelling the baled material some distance from the discharge end of the conveyor.

The structure according to the present invention is characterized by a main elevating conveyor for moving the baled material, such as baled hay, at a relatively low speed, the bales which have been elevated by the main conveyor being fed to a conveyor moving at a much higher speed, so that the bales can be discharged some distance from the conveyor. The faster moving conveyor is characterized by upper and lower endless belt flights arranged to bear against upper and lower sides of the bale, and to hold same firmly therebetween as the bale accelerates from the speed of the slower moving elevating conveyor to the speed of the discharge conveyor.

One of the principal objects of the invention is to provide an improved conveyor characterized by a conveyor moving at slow speed for raising baled material, and by a second conveyor moving at high speed and adapted firmly to engage the baled material and discharge the same some distance from the conveyor.

Another object is to provide a conveyor consisting of a pair of conveyor units, both being operated simultaneously at different speeds, the lower speed conveyor being adapted to raise baled material to a position corresponding approximately to the discharge height, and characterized by the second high speed conveyor which ejects the baled material some distance from the conveyor.

Yet another object is to provide in a conveyor unit consisting of low and high speed conveyors, structure for enabling the high speed conveyor firmly to engage the baled material, so that it can be accelerated from the speed of the low speed conveyor to that of the high speed conveyor, and so that the baled material can be ejected some distance from the conveyor.

Still another object is to provide a conveyor particularly adapted for storing baled hay or the like in a loft over a large area thereof, and to provide a portable conveyor characterized by a slow moving conventional conveyor and a faster moving auxiliary ejecting conveyor, the ejecting conveyor being adapted to direct the ejected material to any part of the loft.

Other objects and important features of the invention will be apparent from a study of the specification following taken with the drawings, which together describe and illustrate a preferred embodiment of the invention and what is now considered to be the best mode of practicing the principles thereof. Other embodiments of the invention may be suggested to those having the benefit of the teachings herein, and such other embodiments are intended to be reserved especially as they fall within the scope and spirit of the subjoined claims.

In the drawings:

FIG. 1 is a fragmentary perspective view of a conveyor embodying the improvements according to the present invention;

FIG. 2 is a fragmentary perspective view of the low speed portion of the conveyor according to the invention, illustrating driving mechanism which may be driven from the conventional power take-off of a tractor or the like;

FIG. 3 is a schematic view illustrating the cooperation of the high speed conveyor with the low speed conveyor, and showing a hay bale moving on the low speed conveyor, and about to be engaged by the high speed conveyor;

FIG. 4 is a view similar to FIG. 3, and showing the hay bale in the grip of the high speed conveyor; and FIG. 5 is a plan view of the conveyor according to the invention.

Figures 1, 2:
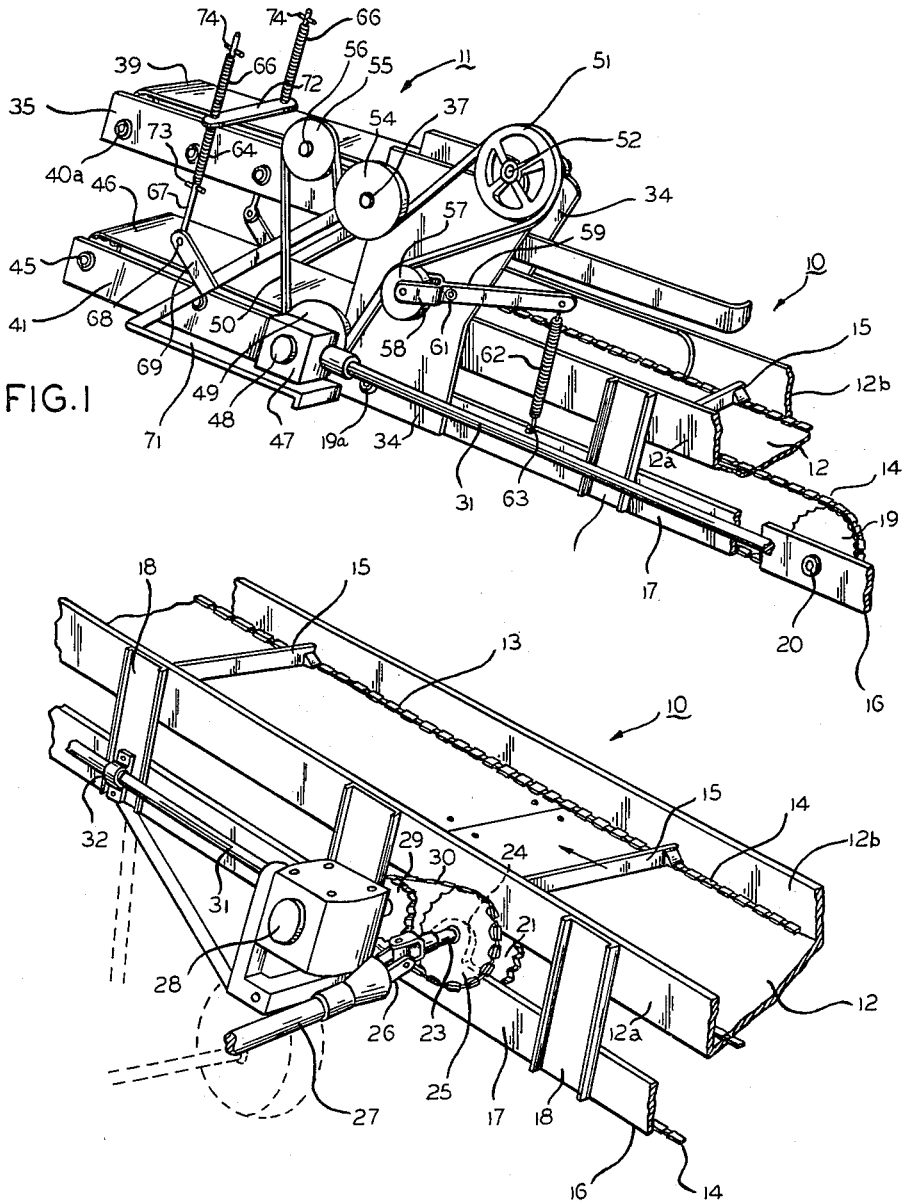

Referring now particularly to FIG. 1 of the drawings, the improvements according to the present invention are embodied in a conventional conveyor assembly 10 for the purpose of elevating bales of hay B or the like, and a discharge conveyor referred to generally by the reference numeral 11. Conveyor assembly 10 is arranged to move and elevate the bales B, see FIG. 3, at a relatively slow speed, and to feed the bales B to the discharge conveyor 11, the bales B being accelerated to the speed thereof, so that they can be discharged some distance therefrom.

The elevating conveyor assembly 10 consists of a base plate 12 having side walls 12A and 12B extending upward therefrom, and base plate 12 and side walls 12A and 12B afford a guide for laterally spaced conveyor sprocket chains 14 having bale engaging flights 15 extending therebetween, the chains 14 and flights 15 moving in the direction shown in the several views to engage bale B seen in FIG. 3. The return reaches of the chains 14 are guided in laterally spaced angle members 16, the legs 17 of which are secured to the side walls 12A and 12B by connecting members 18.

The endless sprocket chains 14 are reeved between idler sprockets 19 supported on idler shafts 20 in turn supported by the upstanding legs 17. One such shaft 20 may be adjusted in its support to maintain the desired tension in chains 14.

Structure is provided for driving the conveyor chains 14, and to this end driving sprockets 21 are disposed between the sprockets 19 and between the two reaches of the chains 14. Sprockets 21 engage the chains 14, and are mounted on a shaft 23 journalled in pillow blocks 24 secured to the upstanding legs 17, see FIGS. 2 and 5. Shaft 23 is driven from a power take off or shaft 27 from any suitable prime mover, not shown, through a universal joint assembly 26.

Shaft 23 has a sprocket 25 fast thereon connected by a sprocket chain 30 to a driving sprocket 29 of a speed reducer or change device 28. Speed reducer 28 is mounted on one of the connecting members 18 and has an output or drive shaft 31 journalled in a bearing 32.

The high speed or discharge conveyor 11 includes a pair of laterally spaced vertical frames 34 attached to upstanding legs 19a and extending upward therefrom. The laterally spaced frames 34 afford a pivoting support for laterally spaced frames 35, see FIG. 1, which pivot about a shaft 37 supported in the spaced frames 34. A pulley 38 is fast on shaft 37, and an endless conveyor belt 39 is trained between pulley 38 and an idler pulley 40 supported on an idler shaft 40A at the other end of the frames 35.

The discharge or high speed conveyor 11 also includes lower laterally spaced fixed frames 41, see again FIG. 1 secured to the vertical frames 34. A driving pulley 42 is fast on a shaft 43 supported at the lower end of frames 34 and an idler pulley 44 is supported on a shaft 45 in turn supported at the opposite end of spaced frames 4. An endless conveyor belt 46 is reeved between the two pulleys 42 and 44.

Power for driving the upper and lower endless conveyor belts 39 and 46 is provided by a speed change device 47 receiving its driving effort from the drive shaft 31. A pulley 49 is mounted on an output shaft 48 of speed change device 47, and drives a belt 50 which is trained about a pulley 51 mounted in a shaft 52 supported in pillow blocks 53 mounted on the top of side frames 34. Belt 50 is then trained about a pulley 54 fast on the shaft 37 driving pulley 38 for endless conveyor belt 39. Belt 50 is then trained about an idler pulley 55 mounted on a stub shaft 56 extending from one of the frames 35, and thence back to pulley 49 on the speed change device 47.

Proper tension is maintained upon belt 50 by an idler pulley 57 mounted in a clevis 58 having an arm 59 pivoted at 61 to one of the side frames 34. Arm 59 and pulley 57 are rocked in a clockwise belt tensioning direction by a spring 62 anchored at one end to arm 59 and at its other end at 63 to one of the vertical legs 17.

It may be noted that driven shaft 48 of speed change device 47 is directly connected by any suitable coupling not shown, to the shaft 43 driving pulley 42. It will be seen that speed change device 47 will drive upper and lower endless belts 39 and 46 in correlative directions, and in a direction corresponding to the direction of the bale B moving on conveyor 10.

The upper and lower endless belts 39 and 46 have a speed greater than the conveyor 10 and thereby accelerate the bale B to a speed whereby it can be ejected some distance from conveyor 11.

The frames 35 supporting endless conveyor belt 39 is constrained toward the fixed frames 41 so as to "nip" the bale between the lower reach of endless conveyor belt 39, and the upper reach of endless conveyor belt 46. Such constraint insures that the bale B will be readily accelerated to the speed of conveyor belts 39 and 46, so that the bale B can be discharged some distance from the rapidly moving conveyor 11.

It will be seen that as the bale B enters between endless belts 39 and 46 that frame 35 will be displaced upward, raising also idler pulley 55. The bight in drive belt 50 at tensioning pulley 54 will during such time be flattened somewhat. At other times the bight at pulley 54 will change by reason of its tensioning position, it always being urged in a drive belt tensioning direction by arm 59 and spring 62.

Structure is provided for supporting the frames 35 in position, so that the bale B will be "nipped" by the endless belts 39 and 46. The frames 35 are accordingly resiliently supported between springs 64 and 66 guided on rods 67 pivotally connected at 68 to a bracket 69 extending from a frame 71 flanking conveyor 11 and secured to side frames 34.

A lateral frame member 72 extends between side frames 35 and is secured to the upper edges of side frames 35 in any convenient fashion. Frame member 72 has an aperture at each end thereof to guide the frame member 72. Spring 64 is constrained between frame member 72 and a stop 73 on guide rod 67, and spring 66 is constrained between frame member 72 and a stop 74 on guide rod 67.

As seen in FIG. 3 the conveyor belts 39 and 46 are convergent so that when the bale B enters therebetween frames 35 will be rocked clockwise against the bias in springs 66 to hold the bale between the two belt runs. The bale B is thereby accelerated readily to the speed of the two belt runs so that the bale B can be discharged some distance from conveyor 11.

Although I have shown a particular arrangement and construction of the component parts constituting my invention, I am fully cognizant of the fact that many changes in the form, shape, and configuration of the parts may be made without effecting their operativeness, and I reserve the right to make such changes as I may deem convenient, without departing from the spirit of my invention, or the scope of the claim.

Having thus described my invention, what I claim and desire to secure by Letters Patent in the United States is:

In a conveyor particularly adapted to elevate and discharge articles such as baled material, the combination of a frame, conveyor means supported on said frame for conveying articles at a low speed, said conveyor means including an endless flight supporting sprocket chain movable in an orbital path, a pair of endless higher speed conveyors supported on said frame and adapted to receive articles from said conveyor means, to accelerate the articles, and to discharge the articles, said high speed endless conveyors comprising a lower endless conveyor, and an upper endless conveyor spaced from said lower endless conveyor, means normally positioning said upper conveyor and said lower conveyor in convergent relation to each other in a discharge direction, means enabling said lower and upper conveyors to be displaced relative to each other by an article conveyed between said upper and lower conveyors, said last named means comprising spring means yielding by the presence of an article between said upper and lower conveyors, and means for driving said conveyor means and said upper and lower conveyors irrespective of the position of said upper conveyor with respect to said lower conveyor, said driving means comprising a power shaft, a sprocket driven by said power shaft and engageable with said sprocket chain, a speed change device driven by said power shaft, and an output drive shaft extending from said speed change device and drivingly connected with said upper and lower conveyors.

References Cited in the file of this patent
UNITED STATES PATENTS

| | | |
|---|---|---|
| 167,519 | Fowler | Sept. 7, 1875 |
| 1,294,675 | Kiner | Feb. 18, 1919 |
| 3,043,418 | Morrison et al. | July 10, 1962 |
| 3,055,519 | Hollyday | Sept. 25, 1962 |